United States Patent
Park et al.

(10) Patent No.: US 11,094,990 B2
(45) Date of Patent: Aug. 17, 2021

(54) METHOD FOR MANUFACTURING BATTERY PACK

(71) Applicant: LG Chem, Ltd., Seoul (KR)

(72) Inventors: Eun Suk Park, Daejeon (KR); Se Woo Yang, Daejeon (KR); Yoon Gyung Cho, Daejeon (KR); Yang Gu Kang, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd.

( * ) Notice: Subject to any disclaimer, the term of this patent is extended or adjusted under 35 U.S.C. 154(b) by 57 days.

(21) Appl. No.: 16/483,307

(22) PCT Filed: Sep. 14, 2018

(86) PCT No.: PCT/KR2018/010846
§ 371 (c)(1),
(2) Date: Aug. 2, 2019

(87) PCT Pub. No.: WO2019/054798
PCT Pub. Date: Mar. 21, 2019

(65) Prior Publication Data
US 2020/0006728 A1    Jan. 2, 2020

(30) Foreign Application Priority Data

Sep. 18, 2017  (KR) .................. 10-2017-0119811

(51) Int. Cl.
*H01M 10/00*      (2006.01)
*H01M 50/20*      (2021.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ............. H01M 10/653; H01M 10/613; H01M 2220/20; H01M 10/625; H01M 2/10; H01M 10/655
See application file for complete search history.

(56) References Cited

U.S. PATENT DOCUMENTS

2010/0258975 A1* 10/2010 Goda ................. B29C 45/2602
                                                          264/272.21
2011/0192564 A1    8/2011 Mommer et al.
(Continued)

FOREIGN PATENT DOCUMENTS

DE    102016202375 A1    8/2017
JP      2012512517 A      5/2012
(Continued)

OTHER PUBLICATIONS

International Search Report for Application No. PCT/KR2018/010846, dated Dec. 14, 2018, pp. 1-2.
(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

A battery pack manufacturing method is provided. The battery pack manufacturing method is capable of performing quality inspection of a battery module before the resin composition injected into the battery module is sufficiently cured to fix battery cells contained in the battery module.

9 Claims, 5 Drawing Sheets

(51) Int. Cl.
*H01M 10/613* (2014.01)
*H01M 10/625* (2014.01)
*H01M 10/653* (2014.01)
*H01M 10/655* (2014.01)

(52) U.S. Cl.
CPC ....... *H01M 10/653* (2015.04); *H01M 10/655* (2015.04); *H01M 2220/20* (2013.01)

(56) References Cited

U.S. PATENT DOCUMENTS

| | | |
|---|---|---|
| 2011/0262792 A1 | 10/2011 | Lee et al. |
| 2012/0009443 A1* | 1/2012 | Baek .................. H01M 2/0404 429/7 |
| 2013/0236753 A1 | 9/2013 | Yue et al. |
| 2016/0197386 A1 | 7/2016 | Moon et al. |
| 2018/0076493 A1 | 3/2018 | Park et al. |
| 2018/0358666 A1 | 12/2018 | Siering et al. |

FOREIGN PATENT DOCUMENTS

| | | |
|---|---|---|
| JP | 2016146247 A | 8/2016 |
| KR | 101460397 B1 | 11/2014 |
| KR | 20160034676 A | 3/2016 |
| KR | 101636378 B1 | 7/2016 |
| KR | 20160105358 A | 9/2016 |
| KR | 20160120685 A | 10/2016 |
| WO | 2013002090 A1 | 1/2013 |
| WO | 2016137303 A1 | 9/2016 |

OTHER PUBLICATIONS

Extended European Search Report with Written Opinion for Application No. 18855829.0 dated Mar. 31, 2020, 9 pages.

* cited by examiner

[Figure 1]
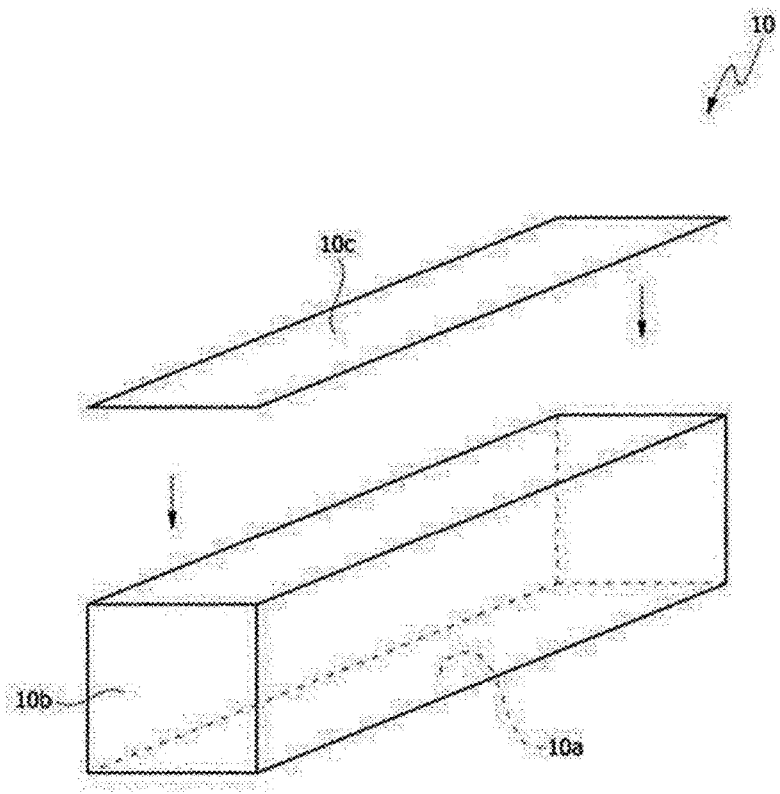

[Figure 2]
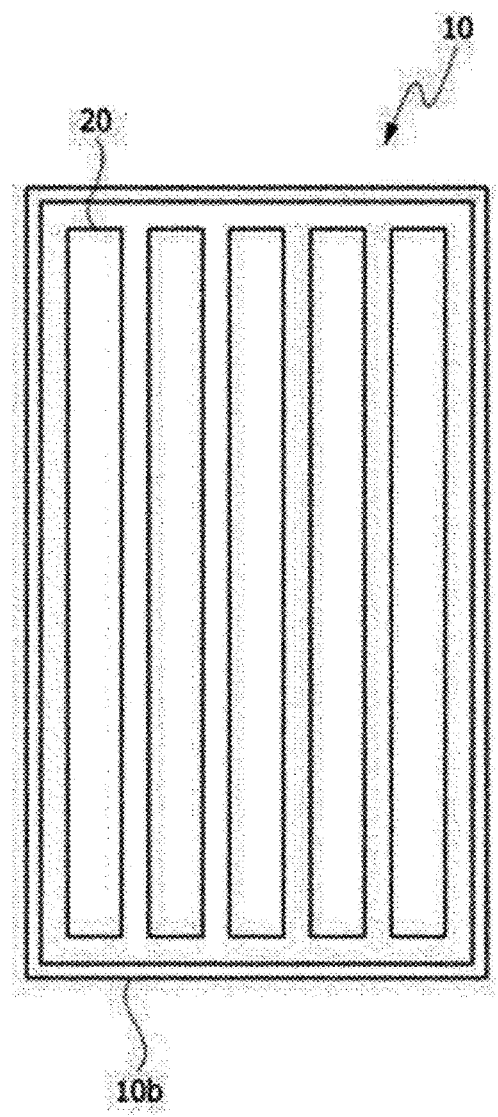

[Figure 3]
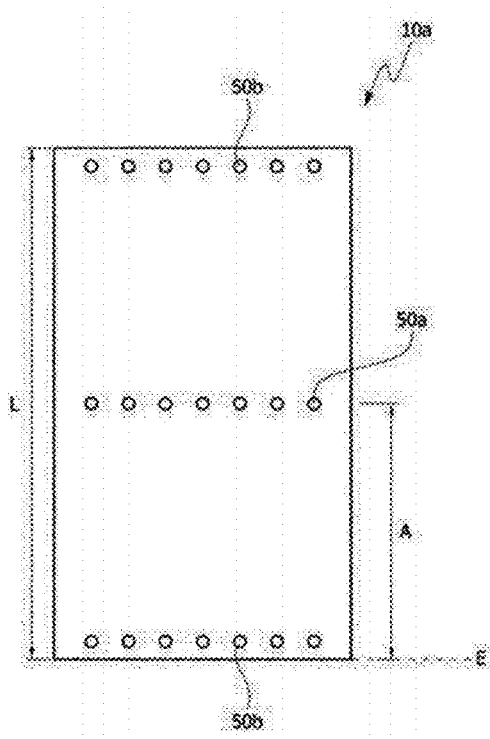

[Figure 4]
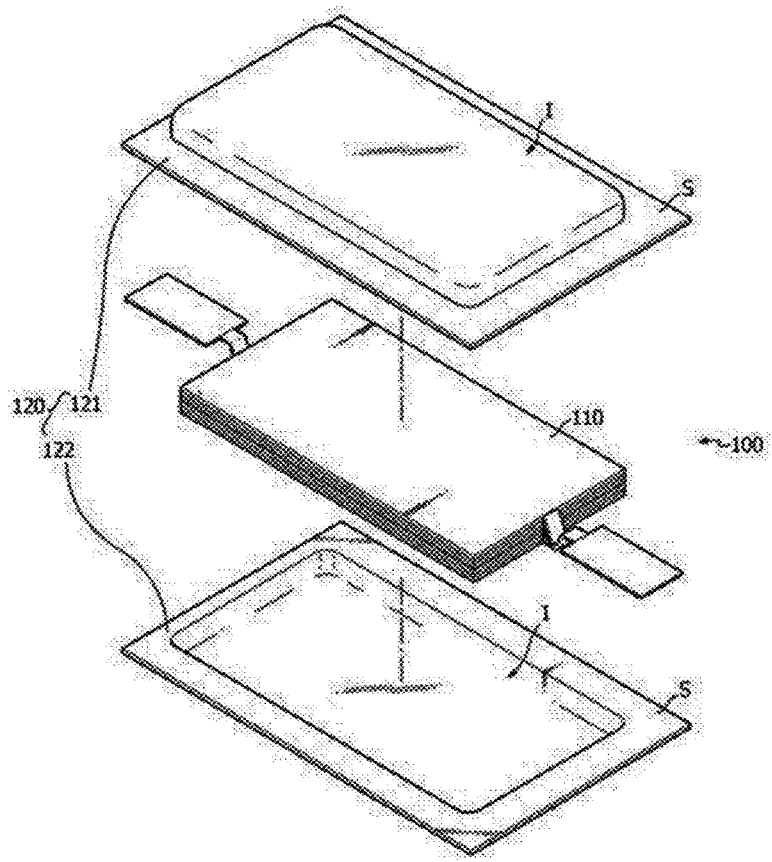
[Figure 5]
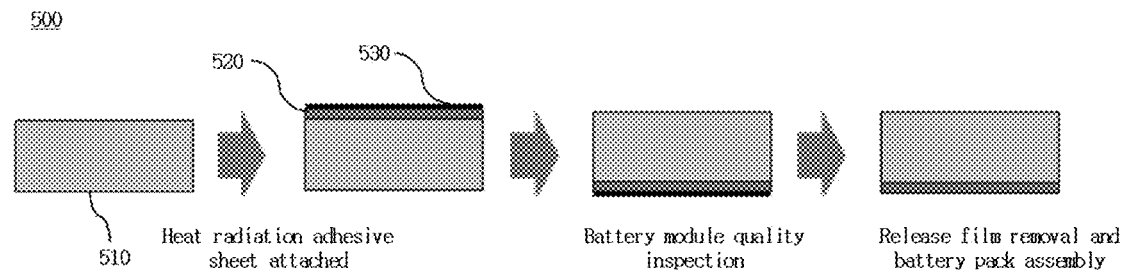

[Figure 6]
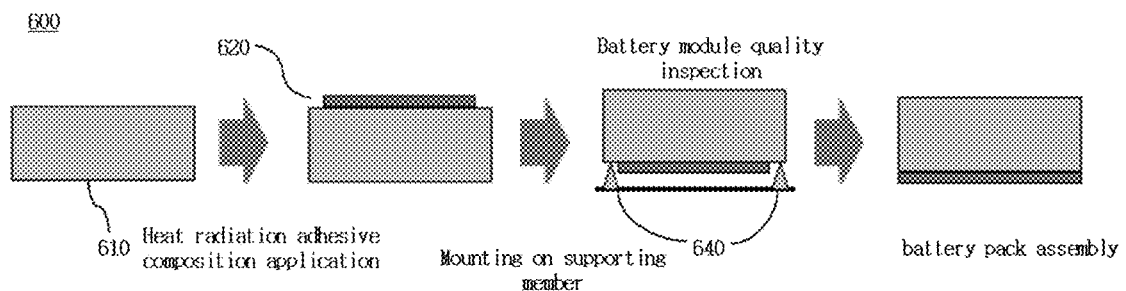
[Figure 7]
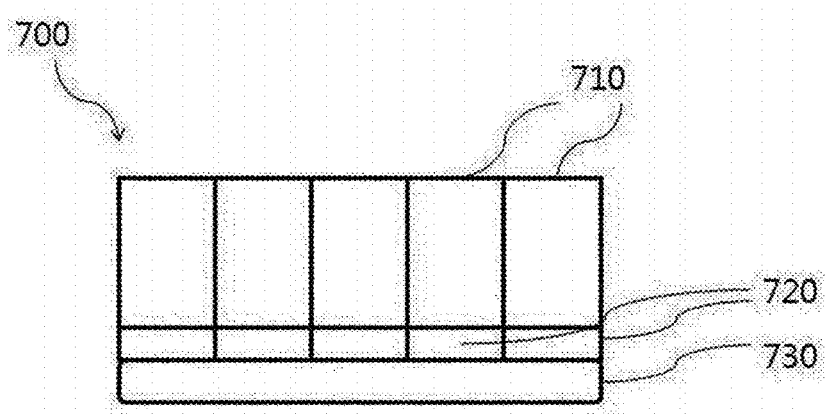

METHOD FOR MANUFACTURING BATTERY PACK

CROSS REFERENCE TO RELATED APPLICATIONS

The present application is a national stage entry under 35 U.S.C. § 371 of International Application No. PCT/KR2018/010846 filed on Sep. 14, 2018, which claims priority to Korean Patent Application No. 10-2017-0119811 filed on Sep. 18, 2017, the disclosures of which are incorporated herein by reference in their entirety.

TECHNICAL FIELD

The present application relates to a method for manufacturing a battery pack.

BACKGROUND ART

Secondary batteries have been used as power sources for energy storage systems (ESS), electric vehicles (EV) or hybrid electric vehicles (HEV), as well as small and advanced electronic devices such as mobile phones, PDAs and notebook computers.

When large amounts of power such as motor driving of an electric vehicle are required, a large-capacity modular battery pack in which battery modules including a plurality of high-power battery cells are connected and constituted is generally used.

The battery cell may be a unit capable of functioning as a secondary battery. The battery module may mean that the plurality of electrically-connected battery cells is housed in a module case. The battery pack may be manufactured by attaching a plurality of battery modules to a base material to be detachable and electrically connecting the plurality of battery modules.

In order to fix the battery cells housed in the module case, the resin composition may be injected into the module case equipped with the battery cells. For releasing the heat generated from the battery cells to the outside as well as fixing the battery cells in the module case, a heat-dissipating adhesive resin composition can be used as the resin composition. When the resin composition has a high viscosity, overload occurs in an injection device during an injection process of the adhesive composition, so that the resin composition is required to have a low viscosity.

However, before assembling a battery pack with battery modules, a quality inspection, for example, an engine hot test, performed on the battery module on the end of line (EOL) can be performed in a state of mounting the battery module so that the lower part of the battery module faces the gravity direction. In this process, the resin composition having a low viscosity characteristic injected through an inlet provided at the bottom of the battery module may flow out through the inlet, and there is a problem that to prevent this, it should be waited for about 3 hours to 4 hours until the resin composition injected into the battery module is sufficiently cured before the EOL quality inspection.

DISCLOSURE

Technical Problem

It is an object of the present application to provide a method for manufacturing a battery pack.

Technical Solution

Among physical properties mentioned in this specification, when the measured temperature affects the results, the relevant physical property is a physical property measured at room temperature, unless otherwise specified. The term room temperature is a natural temperature without being heated or cooled, which is, usually, one temperature in a range of 10° C. to 30° C., or about 23° C. or about 25° C. or so. Also, the unit of the temperature herein is ° C., unless otherwise specified.

Among physical properties mentioned in this specification, when the measured pressure affects the results, the relevant physical property is a physical property measured at normal pressure, unless otherwise specified. The term normal pressure is a natural pressure without being pressurized or depressurized, which is usually about 1 atm or so is referred to as normal pressure.

In one example related to the present application, the present application relates to a method for manufacturing a battery pack.

An exemplary battery pack manufacturing method comprises steps of: injecting a resin composition through an inlet formed on one side of a battery module equipped with a battery cell; forming a heat-dissipating adhesive layer on one side of the battery module on which the inlet is formed; and inspecting the quality of the battery module in a state where one side of the battery module, on which the heat-dissipating adhesive layer is formed, is located at the bottom.

As an example, in the step of injecting a resin composition through an inlet formed on one side of a battery module, in a state where a battery module comprising a module case having an upper plate, a lower plate and side walls, an inner space formed therein and an inlet for an adhesive composition formed on the lower plate; and a battery cell existing in the inner space, is positioned so that the lower plate faces upward, the adhesive composition may be injected through the inlet of the lower plate.

The battery cell may be housed in the module case. One or more battery cells may be present in the module case, and a plurality of battery cells may be housed in the module case. The number of battery cells housed in the module case is adjusted according to the use or the like, which is not particularly limited. The battery cells housed in the module case may be electrically connected to each other.

In the module case, an inner space that the battery cell can be housed is formed, where the module case may comprise at least side walls and a lower plate that form the inner space. The module case may further comprise an upper plate sealing the inner space. The module case may be formed by forming the side walls, the lower plate and the upper plate with each other or assembling the side walls, the lower plate and/or the upper plate, which are each separated. The shape and size of such a module case are not particularly limited, which may be appropriately selected depending on the application, the type and number of battery cells housed in the inner space, and the like.

In this specification, the terms upper plate and lower plate are terms with relative concepts used to distinguish plates constituting a module case. The lower plate may mean a plate which is opposed to the gravity direction when the battery module is attached to a base material of a battery pack and assembled to the battery pack.

BRIEF DESCRIPTION OF DRAWINGS

FIG. 1 is a diagram showing an exemplary module case of the present invention.

FIG. 2 is a diagram showing a form in which battery cells are housed in the module case of FIG. 1.

FIG. 3 is a diagram of an exemplary lower plate in which inlets and observation ports are formed.

FIG. 4 is a diagram showing an exemplary battery pouch of the present invention.

FIG. 5 is a flowchart showing a battery pack manufacturing method comprising a step of forming a heat-dissipating adhesive layer, on which an inlet is formed, by the heat-dissipating adhesive sheet of the present invention.

FIG. 6 is a flowchart showing a battery pack manufacturing method comprising a step of forming a heat-dissipating adhesive layer, on which an inlet is formed, by the heat-dissipating adhesive composition of the present invention.

FIG. 7 is a diagram schematically showing the structure of a battery pack of the present invention.

DETAILED DESCRIPTION OF THE INVENTION

FIG. 1 is a diagram showing an exemplary module case (10). The exemplary module case (10) may be a box-shaped case (10) including one lower plate (10a) and four side walls (10b). The module case (10) may further comprise an upper plate (10c) sealing the inner space.

FIG. 2 is a schematic diagram, as observed from above, showing the module case (10) of FIG. 1 in which battery cells (20) are housed.

A hole may be formed in the lower plate, the side walls and/or the upper plate of the module case. As described below, when a resin layer is formed by an injection process, the hole may be an inlet for injecting a resin composition, which is a formation material of the resin layer. The shape, number and position of the inlet can be adjusted in consideration of the injection efficiency of the formation material of the resin layer. In one example, the inlet may be formed in the lower plate.

In one example, the inlet may be formed at a point of about ¼ to ¾ or a point of about ⅜ to ⅞, or approximately at a middle part, of the total length of the side wall, lower plate or upper plate. The resin layer having a wide contact area may be formed by injecting the resin composition through the inlet formed at this point. For example, as shown in FIG. 3, the ¼, ¾, ⅜ or ⅞ point is a ratio of the distance (A) to the hole forming position relative to the total length (L) measured based on any one end surface (E) such as the lower plate. Here, the end (E) where the length (L) and the distance (A) are formed may also be any end (E) as long as the length (L) and the distance (A) are measured from the same end (E). In FIG. 3, the inlets (50a) are located approximately at the middle part of the lower plate (10a).

The size and shape of the inlet are not particularly limited, where the inlet may be formed in consideration of injection efficiency of a resin layer material to be described below. For example, the inlet may be a circle, an oval, a polygon such as a triangle or a quadrangle, or an amorphous type. The number of the inlets and the interval thereof are not greatly limited, which may be adjusted so that the resin layer may have a wide contact area with the lower plate or the like, as described above.

An observation port (for example, 50b in FIG. 3) may be formed at the end of the side wall, lower plate or upper plate, and the like where the inlet is formed. For example, when the resin layer material is injected through the inlet, such an observation port may be for observing whether the injected material is injected well to the end of the relevant side wall, lower plate or upper plate. The position, shape, size, and number of the observation ports are not limited as long as they can be formed so as to confirm whether the injected material is properly injected.

The module case may be a thermally conductive case. The term thermally conductive case means a case in which the thermal conductivity of the entire case is 10 W/mk or more, or at least a portion having the above thermal conductivity is included. For example, at least one of the side walls, the lower plate and the upper plate as described above may have the above-described thermal conductivity. In another example, at least one of the side walls, the lower plate and the upper plate may comprise a portion having the thermal conductivity.

In the structure of the battery module according to one example of the present application, a resin layer contacting the lower plate and the battery cell and formed by the resin composition injected into the battery module is included. In such a structure, the resin layer may be at least a thermally conductive resin layer, whereby at least the lower plate may be thermally conductive or may comprise a thermally conductive portion.

Here, in another example, the thermal conductivity of the thermally conductive upper plate, lower plate or side walls; or the thermally conductive portion may be about 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or about 195 W/mk or more. The higher the value of the thermal conductivity is, the more advantageous it is from the viewpoint of the heat dissipation property of the module or the like, and thus the upper limit is not particularly limited. In one example, the thermal conductivity may be about 1,000 W/mK or less, 900 W/mk or less, 800 W/mk or less, 700 W/mk or less, 600 W/mk or less, 500 W/mk or less, 400 W/mk or less, 300 W/mk or about 250 W/mK or less, but is not limited thereto. The kind of the material exhibiting the thermal conductivity as above is not particularly limited, and for example, it includes a metal material such as aluminum, gold, silver, tungsten, copper, nickel or platinum. The module case may be composed entirely of such a thermally conductive material, or at least a part of the module case may be a portion composed of the thermally conductive material. Accordingly, the module case may have a thermal conductivity in the above-mentioned range, or may comprise at least a portion having the aforementioned thermal conductivity.

In the module case, the portion having a thermal conductivity in the above range may be a portion contacting the above-mentioned resin layer and/or an insulating layer which may exist between the resin layer and the module case. In addition, the portion having the thermal conductivity may be a portion contacting a cooling medium such as cooling water. According to this structure, a structure capable of effectively discharging the heat generated from the battery cell to the outside can be realized.

The kind of the battery cells housed in the module case is not particularly limited, where all of various known battery cells can be applied. In one example, the battery cell may be a pouch type. Referring to FIG. 4, the pouch type battery cell (100) may typically comprise an electrode assembly, an electrolyte and a pouch exterior material.

The electrode assembly (110) included in the pouch type cell (100) may be in the form that one or more positive electrode plates and one or more negative electrode plates are disposed by placing a separator therebetween. The electrode assembly (110) may be a wound type in which one positive electrode plate and one negative electrode plate are wound together with a separator, or may be divided into a stacked type in which a plurality of positive electrode plates and a plurality of negative electrode plates are alternately stacked by placing each separator therebetween, and the like.

The pouch exterior material (120) may be configured in the form equipped with, for example, an external insulating layer, a metal layer, and an internal adhesive layer. This exterior material (120) protects the electrode assembly (110) and internal elements such as an electrolyte. The metal layer of the electrode assembly (110) may comprise a metal thin film such as aluminum, for protecting internal elements such as an electrolyte, compensating for electrochemical properties by the electrode assembly (110) and considering heat dissipation or the like. Such a metal thin film may be interposed between insulating layers formed of an insulating material, in order to secure an electrical insulation property between the electrode assembly (110) and elements such as an electrolyte or other elements outside the battery (100).

In one example, the exterior material (120) may comprise an upper pouch (121) and a lower pouch (122), where a concave type inner space (I) may be formed in at least one of the upper pouch (121) and the lower pouch (122). The electrode assembly (110) may be housed in such an inner space (I) of the pouch. Sealing parts (S) are provided on outer peripheral surfaces of the upper pouch (121) and the lower pouch (122), where these sealing parts (S) may be bonded to each other to seal the inner space in which the electrode assembly (110) is housed.

Each electrode plate of the electrode assembly (110) is provided with an electrode tab, where one or more electrode tabs may be connected to an electrode lead. The electrode lead is interposed between the sealing parts (S) of the upper pouch (121) and the lower pouch (122) and is exposed to the outside of the exterior material (120), whereby it can function as an electrode terminal of the secondary battery (100).

The form of the pouch type cell is one example, and the battery cell applied in the present application is not limited to the above kind. In the present application, various types of known pouch type cells or other types of cells can be all applied as battery cells.

The resin composition injected in the battery pack manufacturing method of the present application may be a filler-containing resin composition as described below. In this specification, the term filler-containing resin composition is a composition comprising a resin component and a filler. The resin composition may have sufficient fluidity to prevent overloading of an injection device. Here, the fact of having sufficient fluidity may mean that the viscosity is in a range of about 400 cP or less, or about 100 cP to about 400 cP. The lower limit of the viscosity is not particularly limited as long as the resin composition has a sufficiently low viscosity, but may be generally about 10 mPas or more.

On the other hand, when the viscosity is measured in a shear rate range of 0.01 to 10.0/s using a rheological property measuring device (ARES) at room temperature, the viscosity of the resin composition may be a viscosity value measured at the 2.5/s point.

The resin composition may be, for example, an adhesive composition. The adhesive composition may comprise one or more selected from resin components known to be commonly usable as adhesives. The resin can be exemplified by an acrylic resin, a urethane resin, a silicone resin and an epoxy resin, and the like. Among the resin components, it is known that the acrylic resin, the urethane resin and the silicone resin have similar heat conduction properties, the epoxy resin has excellent thermal conductivity relative to them, and the olefin resin has higher thermal conductivity than that of the epoxy resin. Therefore, it is possible to select one having excellent thermal conductivity among the resins, if necessary. However, a desired thermal conductivity is hardly secured with a resin component alone, and as described below, a method of including a filler component having excellent thermal conductivity in a resin composition at a proper ratio can also be applied.

The resin composition may be a thermally conductive resin composition, and the cured product (for example: resin layer) of the thermally conductive resin composition may have a thermal conductivity of about 1.5 W/mK or more, 2 W/mK or more, 2.5 W/mK or more, 3 W/mk or more, 3.5 W/mK or more, or about 4 W/mK or more. The thermal conductivity may be about 50 W/mk or less, 45 W/mk or less, 40 W/mk or less, 35 W/mk or less, 30 W/mk or less, 25 W/mk or less, 20 W/mk or less, 15 W/mk or less, 10 W/mK or less, 5 W/mK or less, 4.5 W/mK or less, or about 4.0 W/mK or less. When the resin composition is a thermally conductive resin composition as above, the lower plate or the like into which the resin composition is injected may be a portion having the above-described thermal conductivity of 10 W/mK or more. At this time, the portion of the module case representing the thermal conductivity may be a portion contacting a cooling medium, for example, cooling water or the like. The thermal conductivity of the thermally conductive resin composition is, for example, a numerical value measured according to ASTM D5470 standard or ISO 22007-2 standard.

For example, after placing a resin layer formed by a resin composition between two copper bars in accordance with the standard of ASTM D 5470, one of the two copper rods contacts a heater, the other contacts a cooler, and then a thermal equilibrium state (a state showing the temperature change of about 0.1° C. or less per 5 minutes) can be created by maintaining the heater at constant temperature and adjusting the capacity of the cooler. The temperature of each copper rod can be measured in the thermal equilibrium state, and the thermal conductivity (K, unit: W/mK) can be evaluated according to the following thermal conductivity equation. When the thermal conductivity is evaluated, the pressure applied to the resin layer can be adjusted to about 11 Kg/25 cm² or so, and when the thickness of the resin layer changes during the measurement, the thermal conductivity can be calculated based on the final thickness.

$$K=(Q \times dx)/(A \times dT) \quad \text{<Thermal Conductivity Equation>}$$

In Equation above, K is a thermal condurtivity (W/mk), Q is heat (unit: W) moved per unit time, dx is the thickness of the resin layer (unit: m), A is the cross-sectional area (unit: m²) of the resin layer, and dT is the temperature difference (unit: K) of the copper rods.

The method of setting the thermal conductivity of the thermally conductive resin composition to the above range is not particularly limited. For example, the thermal conductivity of the thermally conductive resin composition can be adjusted by using a thermally conductive filler to be described below in the resin composition.

The resin composition may be, for example, a urethane resin composition. The urethane resin composition may be a two-component type comprising a main composition containing at least a polyol or the like; and a curing agent composition containing at least an isocyanate compound, which may be cured to form a resin layer.

As the urethane resin composition, a resin composition can be applied, which comprises a polyol having amorphous nature or sufficiently low crystalline nature as the polyol contained in at least the main composition for securing the physical properties.

Here, the term amorphous nature means the case where a crystallization temperature (Tc) and a melting temperature (Tm) are not observed in a DSC (differential scanning calorimetry) analysis to be described below, wherein the DSC analysis can be performed at a rate of 10° C./min in a range of −80° C. to 60° C., and for example, it can be measured by a method of raising the temperature from 25° C. to 60° C. at the rate, and then reducing the temperature to −80° C. again and raising the temperature to 60° C. again. Here, the fact of having sufficiently low crystalline nature also means the case where the melting point (Tm) observed in the DSC analysis is about 20° C. or less, about 15° C. or less, about 10° C. or less, about 5° C. or less, about 0° C. or less, about −5° C. or less, about −10° C. or less, or about −20° C. or less or so. Here, the lower limit of the melting point is not particularly limited, and for example, the melting point may be about −80° C. or more, about −75° C. or more, or about −70° C. or more or so.

Such a polyol can be exemplified by a carboxylic acid polyol and a caprolactone polyol, or specifically, a polyol having a structure to be described below.

The carboxylic acid polyol may be formed by reacting a carboxylic acid with a component including a polyol (e.g., a diol or a triol, and the like), and the caprolactone polyol may be formed by reacting caprolactone with a component including a polyol (e.g., a diol or a triol, and the like). At this time, the carboxylic acid may be a dicarboxylic acid.

At this time, a polyol satisfying the above-described physical properties can be constituted by controlling the kind and ratio of each component.

In one example, the polyol may be a polyol represented by Formula 1 or 2 below.

[Formula 1]

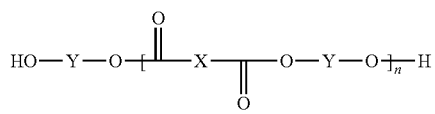

[Formula 2]

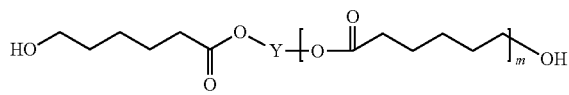

In Formulas 1 and 2, X is a carboxylic acid-derived unit, and Y is a polyol-derived unit. The polyol-derived unit may be, for example, a triol unit or a diol unit. Also, n and m may be any number, and for example, n is a natural number in a range of 2 to 10, and m is a natural number in a range of 1 to 10.

As used herein, the term "carboxylic acid-derived unit" may mean a moiety excluding carboxyl groups in a carboxylic acid compound. Similarly, as used herein, the term "polyol-derived unit" may mean a moiety excluding hydroxyl groups in a polyol compound.

That is, if the hydroxyl group of the polyol reacts with the carboxyl group of the carboxylic acid, the water ($H_2O$) molecule is eliminated by a condensation reaction to form an ester bond. Thus, when the carboxylic acid forms the ester bond by the condensation reaction, the carboxylic acid-derived unit may mean a moiety of the carboxylic acid structure which does not participate in the condensation reaction. Furthermore, the polyol-derived unit may mean a moiety of the polyol structure which does not participate in the condensation reaction.

In addition, Y in Formula 2 also represents a moiety that the polyol forms an ester bond with caprolactone and then the ester bond is excluded. That is, when the polyol and caprolactone form an ester bond, the polyol-derived unit, Y in Formula 2 may mean a moiety of the polyol structure which does not participate in the ester bonding. The ester bonds are represented in Formulas 1 and 2, respectively.

On the other hand, when the polyol-derived unit of Y in the above is a unit derived from a polyol having three or more hydroxyl groups such as a triol unit, a structure in which the Y moiety is branched and formed in the structure of the above formula may be realized.

The kind of the carboxylic acid-derived unit of X in Formula 1 above is not particularly limited, but in order to secure desired physical properties, it may be any one unit selected from the group consisting of a phthalic acid unit, an isophthalic acid unit, a terephthalic acid unit, a trimellitic acid unit, a tetrahydrophthalic acid unit, a hexahydrophthalic acid unit, a tetrachlorophthalic acid unit, an oxalic acid unit, an adipic acid unit, an azelaic acid unit, a sebacic acid unit, a succinic acid unit, a malic acid unit, a glutaric acid unit, a malonic acid unit, a pimelic acid unit, a suberic acid unit, a 2,2-dimethyl succinic acid unit, a 3,3-dimethylglutaric acid unit, a 2,2-dimethylglutaric acid unit, a maleic acid unit, a fumaric acid unit, an itaconic acid unit and a fatty acid unit, where an aliphatic carboxylic acid-derived unit is more advantageous than an aromatic carboxylic acid-derived unit in consideration of the glass transition temperature of the resin layer.

On the other hand, the kind of the polyol-derived unit of Y in Formulas 1 and 2 is not particularly limited, but in order to secure desired physical properties, it may be any one or two or more selected from the group consisting of an ethylene glycol unit, a propylene glycol unit, an 1,2-butylene glycol unit, a 2,3-butylene glycol unit, an 1,3-propanediol unit, an 1,3-butanediol unit, an 1,4-butanediol unit, an 1,6-hexanediol unit, a neopentyl glycol unit, an 1,2-ethylhexyldiol unit, an 1,5-pentanediol unit, an 1,10-decanediol unit, an 1,3-cyclohexanedimethanol unit, an 1,4-cyclohexanedimethanol unit, a glycerin unit and a trimethylolpropane unit.

On the other hand, n in Formula 1 above is any natural number, and the range may be selected in consideration of the desired physical properties. For example, it may be 2 to 10 or 2 to 5.

In addition, m in Formula 2 above is any natural number, where the range may be selected in consideration of the desired properties, and for example, it may be 1 to 10 or 1 to 5.

If n and m are outside the above ranges in Formulas 1 and 2, the polyol is more highly crystalline in nature.

The molecular weight of such a polyol may be controlled in consideration of the desired low viscosity characteristics, durability or adhesiveness, and the like, and for example, it may be in a range of about 300 to about 2000. The molecular weight mentioned herein may be, for example, a weight average molecular weight measured by using GPC (gel permeation chromatograph), and in this specification, the molecular weight of the polymer means a weight average molecular weight, unless otherwise specified. If it is out of the above range, the reliability of the resin layer may be poor or a problem related to volatile components may occur.

On the other hand, the kind of the polyisocyanate contained in the curing agent composition is not particularly limited, but it may be advantageous to be alicyclic series in order to secure desired physical properties.

That is, as the polyisocyanate, an aromatic polyisocyanate compound such as tolylene diisocyanate, diphenylmethane diisocyanate, phenylene diisocyanate, polyethylene phenylene polyisocyanate, xylene diisocyanate, tetramethylxylene diisocyanate, trizine diisocyanate, naphthalene diisocyanate and triphenylmethane triisocyanate; an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isophoron diisocyanate, bis(isocyanatomethyl)cyclohexane diisocyanate or dicyclohexylmethane diisocyanate; or carbodiimide-modified polyisocyanates or isocyanurate-modified polyisocyanates of one or more of the foregoing; and the like may be used. A mixture of two or more of the compounds listed above may also be used.

The ratio of the polyol to the polyisocyanate in the resin composition is not particularly limited, which is appropriately controlled so as to enable the urethane reaction thereof.

In order to incorporate other components such as a filler and a flame retardant to be described below in the resin composition, a desired additive may be compounded to the main composition and/or the curing agent composition of the resin composition and cured.

The resin composition may comprise a filler in consideration of the physical properties such as thermal conductivity as described above. If necessary, thermal conductivity and the like in the above-mentioned range can be ensured through the use of a suitable filler. In one example, the filler included in the resin composition may be a thermally conductive filler. In the present application, the term thermally conductive filler means a material having a thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of the usable thermally conductive filler is not particularly limited, but a ceramic filler can be applied in consideration of the insulation property and the like. For example, ceramic particles such as alumina, AlN (aluminum nitride), BN (boron nitride), silicon nitride, SiC or BeO may be used. Furthermore, if the insulation property of the resin layer formed by the resin composition can be ensured, application of a carbon filler such as graphite may also be considered. The type or ratio of the filler contained in the resin composition is not particularly limited, which may be selected in consideration of the viscosity of the resin composition, the possibility of settling in the resin composition, the desired heat resistance or thermal conductivity, the insulation property, filling effect or dispersibility, and the like. Generally, the larger the size of the filler, the higher the viscosity of the resin composition, whereby there is a high possibility that the filler sinks in the resin composition. Furthermore, the smaller the size, the higher the thermal resistance tends to be. Therefore, an appropriate type of filler may be selected in consideration of such points, and two or more kinds of fillers may also be used, if necessary. In addition, considering the filling amount, it is advantageous to use a spherical filler, but in consideration of network formation or conductivity, and the like, a filler in the form such as a needle shape or a plate shape may also be used. In one example, the resin composition may comprise a thermally conductive filler having an average particle diameter in a range of 0.001 μm to 80 m. In another example, the average particle diameter of the filler may be about 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less.

The ratio of the filler contained in the thermally conductive resin composition can be selected so that the above-mentioned properties, for example, thermal conductivity and the like, can be ensured. For example, the filler may be contained in a range of about 50 to about 2,000 parts by weight relative to 100 parts by weight of the resin components in the resin composition. In another example, the part by weight of the filler may be about 100 parts by weight or more, 150 parts by weight or more, 200 parts by weight or more, 250 parts by weight or more, 300 parts by weight or more, 350 parts by weight or more, 400 parts by weight or more, 500 parts by weight or more, 550 parts by weight or more, 600 parts by weight or more, or about 650 parts by weight or more.

The battery pack manufacturing method of the present application comprises a step of forming a heat-dissipating adhesive layer on one side of a battery module on which an inlet is formed. The one side may mean a lower plate, an upper plate or a side wall, on which an inlet is formed. As one example, a heat-dissipating adhesive layer may be formed on the lower plate of the battery module. The fact to form a heat-dissipating layer on the lower plate of the battery module may mean that when the battery module is attached to a base material of a battery pack and assembled to the battery pack, it forms on a plate provided on the side opposite to the gravity direction.

Therefore, when the heat-dissipating adhesive layer is formed on the lower plate on which the inlet of the battery module injected by the resin composition is formed, the resin composition can be prevented from flowing out through the inlet in the assembling process of the battery pack, so that an inspection process to be described below can be performed without waiting for about 3 hours to 4 hours.

As one example, the thermal conductivity of the heat-dissipating adhesive layer may be about 2 W/mK or more, 2.5 W/mK or more, 3 W/mK or more, 3.5 W/mK or more, or about 4 W/mK or more. The thermal conductivity may be about 50 W/mk or less, 45 W/mk or less, 40 W/mk or less, 35 W/mk or less, 30 W/mk or less, 25 W/mk or less, 20 W/mk or less, 15 W/mk or less, 10 W/mK or less, 5 W/mK or less, 4.5 W/mK or less, or about 4.0 W/mK or less. The thermal conductivity of the heat-dissipating adhesive layer is, for example, a numerical value measured according to ASTM D5470 standard or ISO 22007-2 standard.

For example, after placing a heat-dissipating adhesive layer between two copper plates in accordance with the standard of ASTM D 5470, one of the two copper plates contacts a heater, the other contacts a cooler, and then a thermal equilibrium state (a state showing the temperature change of about 0.1° C. or less per 5 minutes) can be created by maintaining the heater at constant temperature and adjusting the capacity of the cooler. The temperature of each copper plate can be measured in the thermal equilibrium state, and the thermal conductivity (K, unit: W/mK) can be evaluated according to the following thermal conductivity equation. When the thermal conductivity is evaluated, the pressure applied to the heat-dissipating layer can be adjusted to about 11 Kg/25 cm² or so, and when the thickness of the heat-dissipating layer changes during the measurement, the thermal conductivity can be calculated based on the final thickness.

$$K=(Q \times dx)/(A \times dT) \quad \text{<Thermal Conductivity Equation>}$$

In Equation above, K is a thermal conductivity (W/mk), Q is heat (unit: W) moved per unit time, dx is the thickness of the heat-dissipating layer (unit: m), A is the cross-sectional area (unit: m²) of the heat-dissipating layer, and dT is the temperature difference (unit: K) of the copper plates.

The method of setting the thermal conductivity of the heat-dissipating adhesive layer to the above range is not particularly limited. For example, the thermal conductivity of the heat-dissipating adhesive layer can be adjusted by using a thermally conductive filler as a filler included in the heat-dissipating adhesive layer.

The step of forming the heat-dissipating adhesive layer on which the inlet is formed may comprise, as one example, a step of attaching a heat-dissipating adhesive sheet comprising a release film and a heat-dissipating adhesive layer on one side of the battery module on which the inlet is formed. On the other hand, one side of the battery module on which the inlet is formed may be one side of the lower plate on which the inlet is formed. That is, the heat-dissipating adhesive layer may be formed by including a step of attaching a heat-dissipating adhesive sheet comprising a release film and a heat-dissipating adhesive layer on a lower plate of a battery module on which an inlet is formed.

The heat-dissipating adhesive sheet may comprise at least one release film and a heat-dissipating adhesive layer. For example, the heat-dissipating adhesive sheet may have a structure laminated in the order of a release film/a heat-dissipating adhesive layer/a release film, and may have a structure laminated in the order of a heat-dissipating adhesive layer/a release film.

After one release film in the heat-dissipating adhesive sheet comprising two release films is peeled off, the heat-dissipating layer in which the release film is peeled off can be attached to the lower plate of the battery module. In the heat-dissipating sheet comprising one release film, the heat-dissipating adhesive layer can be attached to the lower plate of the battery module without peeling off the release film.

On the other hand, in the step of assembling the battery module to the battery pack, the release film existing on the heat-dissipating adhesive layer of the heat-dissipating adhesive sheet can be removed, which can serve to protect the heat-dissipating adhesive layer included in the heat-dissipating adhesive sheet until the battery module is assembled to the battery pack.

The heat-dissipating adhesive layer on the heat-dissipating adhesive sheet may be formed by a heat-dissipating adhesive composition. The method of forming the heat-dissipating adhesive layer on the heat-dissipating adhesive sheet is not particularly limited and it can be formed by a known method. As one example, a heat-dissipating adhesive composition may be coated on a base film and cured to form a heat-dissipating adhesive layer. As another example, a heat-dissipating adhesive composition may be impregnated on a base film and cured to form a heat-dissipating adhesive layer.

The heat-dissipating adhesive composition for forming the heat-dissipating adhesive layer on the heat-dissipating adhesive sheet may comprise one or more selected from resin components known to be commonly usable. The resin can be exemplified by an acrylic resin, a urethane resin, a silicone resin and an epoxy resin, and the like. Among the resin components, it is known that the acrylic resin, the urethane resin and the silicone resin have similar heat conduction properties, the epoxy resin has excellent thermal conductivity relative to them, and the olefin resin has higher thermal conductivity than that of the epoxy resin. Therefore, it is possible to select one having excellent thermal conductivity among the resins, if necessary. However, a desired thermal conductivity of the heat-dissipating adhesive layer is hardly secured with a resin component alone, and a method of including a filler component, which is described below, in a heat-dissipating adhesive composition at a proper ratio can also be applied.

As one example, the heat-dissipating adhesive composition for forming the heat-dissipating adhesive layer on the heat-dissipating adhesive sheet may be, for example, a urethane heat-dissipating adhesive composition. The urethane heat-dissipating adhesive composition may comprise at least a polyol and a polyisocyanate. Such a polyol can be exemplified by a carboxylic acid polyol or a caprolactone polyol.

The carboxylic acid polyol may be formed by reacting a carboxylic acid with a component including a polyol (e.g., a diol or a triol, and the like), and the caprolactone polyol may be formed by reacting caprolactone with a component including a polyol (e.g., a diol or a triol, and the like). At this time, the carboxylic acid may be a dicarboxylic acid.

The kind of the polyisocyanate contained in the urethane heat-dissipating adhesive composition is not particularly limited, but it may be advantageous to be alicyclic series in order to secure desired physical properties.

That is, as the polyisocyanate, an aromatic polyisocyanate compound such as tolylene diisocyanate, diphenylmethane diisocyanate, phenylene diisocyanate, polyethylene phenylene polyisocyanate, xylene diisocyanate, tetramethylxylene diisocyanate, trizine diisocyanate, naphthalene diisocyanate and triphenylmethane triisocyanate; an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isophorone diisocyanate, bis(isocyanatomethyl)cyclohexane diisocyanate or dicyclohexylmethane diisocyanate; or carbodiimide-modified polyisocyanates or isocyanurate-modified polyisocyanates of one or more of the foregoing; and the like may be used. A mixture of two or more of the compounds listed above may also be used.

On the other hand, the heat-dissipating adhesive composition for forming the heat-dissipating adhesive layer on the heat-dissipating adhesive sheet may comprise a filler in consideration of physical properties such as thermal conductivity as described above. In one example, the filler included in the heat-dissipating adhesive composition may be a thermally conductive filler.

The thermal conductivity of the thermally conductive filler may be about 400 W/mK or less, about 350 W/mK or less, or about 300 W/mK or less. The kind of the usable thermally conductive filler is not particularly limited, but a ceramic filler can be applied in consideration of the insulation property and the like. For example, ceramic particles such as alumina, AlN (aluminum nitride), BN (boron nitride), silicon nitride, SiC or BeO may be used. Furthermore, if the insulation property of the heat-dissipating layer formed by the heat-dissipating adhesive composition can be ensured, application of a carbon filler such as graphite may also be considered. The type or ratio of the filler contained in the heat-dissipating adhesive composition is not particularly limited, which may be selected in consideration of the viscosity of the heat-dissipating adhesive composition, the possibility of settling in the heat-dissipating adhesive composition, the desired thermal conductivity, and the like. Generally, the larger the size of the filler, the higher the viscosity of the heat-dissipating adhesive composition, whereby there is a high possibility that the filler sinks in the heat-dissipating adhesive composition. Furthermore, the smaller the size, the higher the thermal resistance tends to be. Therefore, an appropriate type of filler may be selected in consideration of such points, and two or more kinds of fillers may also be used, if necessary. In addition, considering the filling amount, it is advantageous to use a spherical filler, but in consideration of network formation or conductivity, and the like, a filler in the form such as a needle shape or a plate shape may also be used. In one example, the heat-dissipating adhesive composition may comprise a thermally conductive filler having an average particle diameter in a range of 0.001 μm to 80 m. In another example, the average particle diameter of the filler may be about 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less.

The ratio of the filler contained in the thermally conductive heat-dissipating adhesive composition can be selected so that the above-mentioned properties, for example, thermal conductivity and the like, can be ensured. For example, the filler may be contained in a range of about 50 to about 2,000 parts by weight relative to 100 parts by weight of the adhesive components in the heat-dissipating adhesive composition. The adhesive component may mean, for example, a polyol and a polyisocyanate. In another example, the part by weight of the filler may be about 100 parts by weight or more, 150 parts by weight or more, 200 parts by weight or more, 250 parts by weight or more, 300 parts by weight or more, 350 parts by weight or more, 400 parts by weight or more, 500 parts by weight or more, 550 parts by weight or more, 600 parts by weight or more, or about 650 parts by weight or more.

As long as the release film can be easily peeled off from the heat-dissipating adhesive layer when the heat-dissipating adhesive layer is attached on the lower plate of the battery module or can be easily peeled off in a battery pack manufacturing step to be described below after being attached and simultaneously protect the heat-dissipating adhesive layer up to the battery pack manufacturing step, the material is not particularly limited. In one example, as the release film, a polyester (POET) film, one side or both sides of which have been subjected to surface treatment, can be used. As a heat-dissipating adhesive sheet provided with the release film is used, even if the heat-dissipating adhesive layer of the heat-dissipating adhesive sheet is attached on the lower plate of the battery module and thus the battery module is mounted so that the lower plate of the battery module is opposed to the gravity direction in a quality inspecting process to be described below, it is possible to prevent the above-mentioned heat-dissipating adhesive layer from being damaged by contact with the floor during the quality inspecting process.

The step of forming a heat-dissipating adhesive layer on which the inlet is formed may comprise, as another example, a step of applying the heat-dissipating adhesive composition to one side of the battery module on which the inlet is formed. On the other hand, one side of the battery module, on which the inlet is formed, may be one side of the lower plate on which the inlet is formed. That is, the heat-dissipating adhesive layer may be formed by including a step of applying the heat-dissipating adhesive composition on the lower plate of the battery module on which the inlet is formed. On the other hand, the method of applying the heat-dissipating adhesive composition on the lower plate is not particularly limited, and it can be applied on the lower plate by a known method.

As long as the heat-dissipating adhesive composition for forming the heat-dissipating adhesive layer can satisfy the above-described thermal conductivity or thixotropy to be described below, and the like, the kind thereof is not particularly limited. In one example, the heat-dissipating adhesive composition satisfying the above physical properties may be a urethane heat-dissipating adhesive composition.

The urethane heat-dissipating adhesive composition may be a two-component type comprising a main composition containing at least a polyol or the like; and a curing agent composition containing at least an isocyanate compound, which may be cured to form a heat-dissipating adhesive layer.

The heat-dissipating adhesive composition may comprise a filler in consideration of the physical properties such as thermal conductivity as described above. If necessary, thermal conductivity and the like in the above-mentioned range can be ensured through the use of a suitable filler. In one example, the filler included in the heat-dissipating adhesive composition may be a thermally conductive filler.

The thermal conductivity of the thermally conductive filler may be about 400 W/mK or less, about 350 W/mK or less, or about 300 W/mK or less. The kind of the usable thermally conductive filler is not particularly limited, but a ceramic filler can be applied in consideration of the insulation property and the like. For example, ceramic particles such as alumina, AlN (aluminum nitride), BN (boron nitride), silicon nitride, SiC or BeO may be used. Furthermore, if the insulation property of the heat-dissipating layer formed by the heat-dissipating adhesive composition can be ensured, application of a carbon filler such as graphite may also be considered. The type or ratio of the filler contained in the heat-dissipating adhesive composition is not particularly limited, which may be selected in consideration of the viscosity of the heat-dissipating adhesive composition, the possibility of settling in the heat-dissipating adhesive composition, the desired thermal conductivity, and the like. Generally, the larger the size of the filler, the higher the viscosity of the heat-dissipating adhesive composition, whereby there is a high possibility that the filler sinks in the heat-dissipating adhesive composition. Furthermore, the smaller the size, the higher the thermal resistance tends to be. Therefore, an appropriate type of filler may be selected in consideration of such points, and two or more kinds of fillers may also be used, if necessary. In addition, considering the filling amount, it is advantageous to use a spherical filler, but in consideration of network formation or conductivity, and the like, a filler in the form such as a needle shape or a plate shape may also be used. In one example, the heat-dissipating adhesive composition may comprise a thermally conductive filler having an average particle diameter in a range of 0.001 μm to 80 m. In another example, the average particle diameter of the filler may be about 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less.

The ratio of the filler contained in the thermally conductive heat-dissipating adhesive composition can be selected so that the above-mentioned properties, for example, thermal conductivity and the like, can be ensured. For example, the filler may be contained in a range of about 50 to about 2,000 parts by weight relative to 100 parts by weight of the adhesive components in the heat-dissipating adhesive composition. On the other hand, the adhesive component may mean a polyol and a polyisocyanate. In another example, the part by weight of the filler may be about 100 parts by weight or more, 150 parts by weight or more, 200 parts by weight or more, 250 parts by weight or more, 300 parts by weight or more, 350 parts by weight or more, 400 parts by weight or more, 500 parts by weight or more, 550 parts by weight or more, 600 parts by weight or more, or about 650 parts by weight or more.

As one example, the usable heat-dissipating adhesive composition may be a composition having excellent thixotropy. In this specification, the thixotropy means a property having no fluidity in a static state but having fluidity when vibrated. The method of measuring thixotropy is not particularly limited, and it can be measured through a rheology instrument known in the art. For example, a BROOKFIELD viscometer DV-II+Pro can be used as the rheology instrument. By using the adhesive composition having excellent thixotropy, the generation of bubbles can be suppressed in the heat-dissipating adhesive layer formed by the heat-dissipating adhesive composition to form the heat-dissipating adhesive layer having excellent heat-dissipating performance. In one example, the heat-dissipating adhesive composition may have a thixotropic index (T) in a range of 1 to 8 according to Equation 1 below.

$$T = V_{0.5}/V_5 \qquad \text{[Equation 1]}$$

In Equation 1 above, $V_{0.5}$ is the viscosity of the heat-dissipating adhesive composition as measured by a BROOKFIELD viscometer at a temperature of 25° C., a rotational speed of 0.5 rpm and a CPA-52Z spindle, and $V_5$ represents the viscosity of the heat-dissipating adhesive composition as measured by a BROOKFIELD viscometer at a temperature of 25° C., a rotational speed of 5 rpm and a CPA-52Z spindle.

In one example, the lower limit of the thixotropic index of the heat-dissipating adhesive composition may be about 1.5 or more, or about 2 or more. The upper limit of the thixotropic index of the heat-dissipating adhesive composition may be, for example, about 6 or less, or about 4 or less.

The method of allowing the heat-dissipating composition to have the above-mentioned thixotropic index may include, for example, adding a thixotropy-imparting agent to the heat-dissipating adhesive composition. An example of the thixotropy-imparting agent may include calcium carbonate ($CaCO_3$), alumina, talc or fumed silica, and the like.

The step of applying the heat-dissipating adhesive composition onto the lower plate of the battery module may be performed such that the ratio of the area applied with the heat-dissipating adhesive composition is 70% to 99% of the area of the lower plate of the battery module. By adjusting the ratio of the area applied with the heat-dissipating adhesive composition as described above, the battery module can be easily separated after assembling the battery pack with the battery module and the applied heat-dissipating adhesive can be prevented from being contaminated in an inspection process to be described below. The lower limit of the area ratio may be, for example, about 75% or more, 80% or more, or about 85% or more. The upper limit of the area ratio may be, for example, about 95% or less, or about 90% or less.

The step of forming the heat-dissipating adhesive layer on which the inlet is formed may further comprise a step of applying the heat-dissipating adhesive composition and then curing it. The curing of the heat-dissipating adhesive composition includes heat curing, light curing, room temperature curing and the like, where the curing method is not particularly limited, and it can be cured by a known method.

Through the curing step, the curing speed of the heat-dissipating adhesive composition applied on the lower plate of the battery module can be accelerated and thus the quality inspection of the battery module can be performed earlier so that the productivity of the battery pack can be improved.

The battery pack manufacturing method of the present application may comprise a step of inspecting the quality of the battery module in a state where one side of the battery module on which the heat-dissipating adhesive layer is formed is positioned at the bottom.

As one example, the step of inspecting the quality of the battery module may be a step of performing the inspecting process in a state where the lower plate of the battery module faces downward. In this specification, the state where the lower plate faces downward may mean a state where the battery module is mounted such that the lower plate of the battery module faces the gravity direction.

On the other hand, the quality inspection of the battery module may be, for example, an engine hot test. Such quality inspection of the battery module may be performed on an end of line (EOL) before assembling the battery pack with the battery module.

When the battery module is applied to an electric vehicle (EV) or a hybrid electric vehicle (HEV), and the like, it is applied in a state where the lower plate of the battery module faces downward, and thus it is also mounted in a state where the lower plate of the battery module faces downward to perform the quality inspection of the battery module.

As one example, when the heat-dissipating adhesive is applied to a part on one side of the battery module, for example, on the lower plate, as described above, the step of inspecting the quality of the battery module of the present application may further comprise a step of mounting a supporting member such that in the battery module in which the heat-dissipating adhesive composition is applied to one side, it supports a battery module portion of the one side to which the heat-dissipating adhesive composition is not applied.

When the heat-dissipating adhesive is applied to some area of one side of the battery module on which the inlet is formed as above, the shape of the area applied with the heat-dissipating adhesive is not particularly limited, which may be, for example, a rectangular, circular, or stripe shape, and the like.

On the other hand, the material and shape of the supporting member are not particularly limited as long as it can support the battery module in the inspection process, which can be selected in consideration of the durability and the contact area with the battery module.

When the heat-dissipating adhesive layer is formed on the lower plate of the battery module by applying the heat-dissipating adhesive composition, the ratio of the area applied with the heat-dissipating adhesive composition may be about 70% to about 99% % of the area on the lower plate of the battery module, as described above, and a part of the lower plate can be exposed without the applied heat-dissipating adhesive composition. Therefore, when the battery module is positioned on the supporting member so that the lower plate faces downward, the applied heat-dissipating adhesive composition may not contact the supporting member. Accordingly, it is possible to prevent the heat-dissipating adhesive applied on one side of the battery module from being damaged.

The battery pack manufacturing method of the present application may comprise an assembling step of attaching the lower plate of the battery module to a heat sink. The battery pack may comprise a plurality of battery modules depending on the application, and the battery modules may be electrically connected to each other.

The heat sink may mean a means capable of promoting release of heat generated in the battery module, which may be, for example, a pipe equipped with a flow path through which a cooling medium flows. The cooling medium is not particularly limited as long as it can absorb heat generated in the battery module, but for example, water can be used.

By attaching the lower plate of the battery module to the heat sink in the assembling step, the heat generated in the battery cell can be transferred to the heat-dissipating adhesive layer formed on the lower plate of the battery module through the thermally conductive adhesive composition layer formed on the lower plate side of the battery module, and the heat can be transferred from the heat-dissipating adhesive layer formed on the lower plate of the battery module to the heat sink.

FIG. 7 is a schematic diagram of an exemplary battery pack manufactured by the battery pack manufacturing method of the present application. According to FIG. 7, the battery pack (700) comprises a heat sink (730), where battery modules (710) having a heat-dissipating adhesive layer (720) formed on the lower plate may be attached onto the heat sink.

Advantageous Effects

The present application can provide a battery pack manufacturing method capable of efficiently manufacturing a battery pack.

MODE FOR INVENTION

Hereinafter, the battery pack manufacturing method will be described in detail with reference to the accompanying drawings and examples, but the scope of the battery pack manufacturing method is not limited by the following examples.

Experimental Example 1. Measurement of Thixotropic Index

The thixotropic index of the heat-dissipating adhesive used in Production Example 2 was measured according to Equation 1 below.

$$T = V_{0.5}/V_5 \qquad \text{[Equation 1]}$$

In Equation 1 above, $V_{0.5}$ is the viscosity of the adhesive composition as measured by a BROOKFIELD viscometer at a temperature of 25° C., a rotational speed of 0.5 rpm and a CPA-52Z spindle, and $V_5$ represents the viscosity of the adhesive composition as measured by a BROOKFIELD viscometer at a temperature of 25° C., a rotational speed of 5 rpm and a CPA-52Z spindle.

Production Example 1. Battery Pack Manufacturing Method Using Heat-Dissipating Adhesive Sheet A battery pack was manufactured (500) according to the procedure shown in FIG. 5. A urethane series two-component type resin composition filled with a ceramic filler was injected through inlets of the lower plate of the battery module (510) comprising the module case shown in FIG. 1, wherein the inlets and observation ports were formed on the lower plate of the battery module as in FIG. 3. The heat-dissipating adhesive layer of a heat-dissipating adhesive sheet sequentially comprising a release film (530) and a heat-dissipating adhesive layer (520) having a thermal conductivity of 2.0 W/mK was attached on the lower plate of the battery module, on which the inlets were formed, 20 minutes after the injection of the resin composition to seal the inlets. The lower plate of the battery module faced downward and then the quality inspection of the battery module was performed. Even though the battery module was positioned so that the lower plate of the battery module faced downward just 20 minutes after the injection of the resin composition to the battery module and then the quality inspection of the battery module was performed, the resin composition injected into the battery module through the inlets did not flow out.

Production Example 2. Battery Pack Manufacturing Method Using Heat-Dissipating Adhesive The battery pack was manufactured (600) according to the procedure shown in FIG. 6. A urethane series two-component type resin composition filled with a ceramic filler was injected through inlets of the lower plate of the battery module (610) comprising the module case shown in FIG. 1, on which inlets and observation ports were formed as FIG. 3. 20 minutes after the injection of the resin composition, a urethane series two-component type heat-dissipating adhesive composition (620) having a thixotropic index of 3 and a thermal conductivity of 3 W/mK was applied on the lower plate of the battery module, on which inlets were formed, to seal the inlets. The application of the heat-dissipating adhesive composition (620) was performed except for portions where pins contacted the battery module while supporting the battery module in a process of mounting the battery module to be described below. The area to which the heat-dissipating adhesive composition was applied was about 85% of the total area of the lower plate of the battery module to which the heat-dissipating adhesive composition was applied. The battery module was mounted on the four pins (640) so that the lower plate faced downward and then the quality inspection of the battery module was performed. Even though the battery module was positioned so that the lower plate of the battery module faced downward just 20 minutes after the injection of the resin composition to the battery module and then the quality inspection of the battery module was performed, the resin composition injected into the battery module through the inlets did not flow out.

The invention claimed is:
1. A method for manufacturing a battery pack comprising:
injecting a resin composition through an inlet formed on a first side of a battery module, wherein the battery module is equipped with a plurality of battery cells;

forming a heat-dissipating adhesive layer on the first side of the battery module; and performing a quality inspection of the battery module, wherein the first side of the battery module is directed downward at the time of the quality inspection of the battery module.

2. The method according to claim 1, wherein the heat-dissipating adhesive layer has a thermal conductivity of 2 W/mK or more.

3. The method according to claim 1, wherein the forming a heating-dissipating adhesive layer comprises attaching a heat-dissipating adhesive sheet comprising a release film and a heat-dissipating adhesive layer to the first side of the battery module.

4. The method according to claim 1, wherein the forming a heat-dissipating adhesive layer comprises applying a heat-dissipating adhesive composition on the first side of the battery module.

5. The method according to claim 4, wherein the forming a heat-dissipating adhesive layer comprises applying the heat-dissipating adhesive composition having a thixotropic index (T) in a range of 1 to 8 in accordance with Equation 1 below to the first side of the battery module:

$$T = V_{0.5}/V_5 \qquad [\text{Equation 1}]$$

wherein, $V_{0.5}$ is a viscosity of the heat-dissipating adhesive composition as measured by a viscometer at a temperature of 25° C., a rotational speed of 0.5 rpm and a CPA-52Z spindle, and $V_5$ represents a viscosity of the heat-dissipating adhesive composition as measured by a viscometer at a temperature of 25° C., a rotational speed of 5 rpm and a CPA-52Z spindle.

6. The method according to claim 4, wherein a ratio of area applied with the heat-dissipating adhesive composition is 70% to 99% of area of the first side of the battery module.

7. The method according to claim 4, wherein the forming the heat-dissipating adhesive layer further comprises applying the heat-dissipating adhesive composition and then curing the heat-dissipating adhesive composition.

8. The method according to claim 4, wherein the performing the quality inspection of the battery module comprises mounting a supporting member on the battery module, in which the heat-dissipating adhesive composition is applied to the first side, the supporting member supports a battery module portion of a second side to which the heat-dissipating adhesive composition is not applied.

9. The method according to claim 2, wherein the heat-dissipating adhesive layer has a thermal conductivity of 2 W/mK to 50 W/mK.

* * * * *